United States Patent
Armbruster et al.

(10) Patent No.: US 9,664,898 B2
(45) Date of Patent: May 30, 2017

(54) LASER DEVICE AND METHOD FOR MARKING AN OBJECT

(75) Inventors: Kevin L. Armbruster, Chicopee, MA (US); Brad D. Gilmartin, Gardner, MA (US); Peter J. Kueckendahl, Bad Oldesloe (DE); Bernard J. Richard, Dudley, MA (US); Daniel J. Ryan, Sycamore, IL (US)

(73) Assignee: ALLTEC ANGEWANDTE LASERLICHT TECHNOLOGIE GMBH, Selmsdorf (DE)

( * ) Notice: Subject to any disclaimer, the term of this patent is extended or adjusted under 35 U.S.C. 154(b) by 500 days.

(21) Appl. No.: 14/342,504

(22) PCT Filed: Jul. 19, 2012

(86) PCT No.: PCT/EP2012/003070
§ 371 (c)(1),
(2), (4) Date: Mar. 3, 2014

(87) PCT Pub. No.: WO2013/034215
PCT Pub. Date: Mar. 14, 2013

(65) Prior Publication Data
US 2014/0202998 A1 Jul. 24, 2014

(30) Foreign Application Priority Data
Sep. 5, 2011 (EP) .................................. 11007186

(51) Int. Cl.
*G02B 26/10* (2006.01)
*B23K 26/06* (2014.01)
(Continued)

(52) U.S. Cl.
CPC .............. *G02B 26/10* (2013.01); *B23K 26/00* (2013.01); *B23K 26/0608* (2013.01);
(Continued)

(58) Field of Classification Search
CPC .................................. H01S 3/073; H01S 3/076
See application file for complete search history.

(56) References Cited

U.S. PATENT DOCUMENTS 2,359,780 A 10/1944 Glenn
3,465,358 A 9/1969 Bridges
(Continued)

FOREIGN PATENT DOCUMENTS

DE 4029187 A1 3/1992
DE 4212390 A1 10/1993
(Continued)

OTHER PUBLICATIONS

Notice of Allowance and Fee(s) Due for U.S. Appl. No. 14/342,494, dated Feb. 10, 2016, 28 pages.
(Continued)

*Primary Examiner* — Tu B Hoang
*Assistant Examiner* — Erin McGrath
(74) *Attorney, Agent, or Firm* — Hoffman Warnick LLC

(57) ABSTRACT

Laser device comprising at least two gas laser units (10), stacked in layers, each laser unit comprising a plurality of resonator tubes (12), the resonator tubes being in fluidic communication with each other and forming a common tubular space, connecting elements (20, 21) for connecting adjacent resonator tubes so as to form a loop, mirrors (22) arranged in the connecting elements for reflecting the laser light between the resonator tubes, a rear mirror (44) and a partially reflecting output coupler (42) for coupling out a laser beam. In each laser unit an integrated output flange (40) comprises the rear mirror, the partially reflecting output coupler and an output mirror (46) which deflects the laser beam passing through the output coupler to a scanning
(Continued)

device (80) located in the central space (8) surrounded by the resonator tubes. The invention also relates to a method for marking an object.

7 Claims, 11 Drawing Sheets

(51) Int. Cl.
    *H01S 3/07*     (2006.01)
    *H01S 3/23*     (2006.01)
    *H01S 3/00*     (2006.01)
    *H01S 3/03*     (2006.01)
    *B23K 26/00*     (2014.01)
    *B23K 26/70*     (2014.01)
    *B23K 26/142*     (2014.01)
    *B23K 26/082*     (2014.01)
    *H01S 3/0975*     (2006.01)
    *H01S 3/223*     (2006.01)
    *H01S 3/041*     (2006.01)

(52) U.S. Cl.
    CPC .......... *B23K 26/082* (2015.10); *B23K 26/142* (2015.10); *B23K 26/702* (2015.10); *B23K 26/703* (2015.10); *H01S 3/0071* (2013.01); *H01S 3/03* (2013.01); *H01S 3/076* (2013.01); *H01S 3/2383* (2013.01); *H01S 3/041* (2013.01); *H01S 3/0975* (2013.01); *H01S 3/2232* (2013.01)

(56) References Cited

U.S. PATENT DOCUMENTS

| | | |
|---|---|---|
| 3,533,012 A | 10/1970 | Johnson et al. |
| 3,564,449 A | 2/1971 | Muller et al. |
| 3,564,452 A | 2/1971 | Rempel |
| 3,596,202 A | 7/1971 | Patel |
| 3,602,837 A | 8/1971 | Goldsborough |
| 3,609,584 A | 9/1971 | Stitch et al. |
| 3,628,175 A | 12/1971 | Rigden |
| 3,638,137 A | 1/1972 | Krupke |
| 3,646,476 A | 2/1972 | Barker et al. |
| 3,705,999 A | 12/1972 | Hermann et al. |
| 3,721,915 A | 3/1973 | Reilly |
| 3,801,929 A | 4/1974 | Kawasaki |
| 3,851,272 A | 11/1974 | Shull et al. |
| 3,900,804 A | 8/1975 | Davis et al. |
| 3,919,663 A | 11/1975 | Caruolo et al. |
| 3,946,233 A | 3/1976 | Erben et al. |
| 4,053,851 A | 10/1977 | Krupke |
| 4,122,853 A | 10/1978 | Smith |
| 4,125,755 A | 11/1978 | Plamquist |
| 4,131,782 A | 12/1978 | Einstein et al. |
| 4,170,405 A * | 10/1979 | Sziklas ............ H01S 3/0818 359/859 |
| 4,189,687 A | 2/1980 | Wieder et al. |
| 4,270,845 A | 6/1981 | Takizawa et al. |
| 4,376,496 A | 3/1983 | Sedam et al. |
| 4,404,571 A * | 9/1983 | Kitamura ............ G01D 9/42 347/235 |
| 4,467,334 A | 8/1984 | Anzai |
| 4,477,907 A | 10/1984 | McMahan |
| 4,500,996 A | 2/1985 | Sasnett et al. |
| 4,500,998 A | 2/1985 | Kuwabaraet et al. |
| 4,512,639 A | 4/1985 | Roberts et al. |
| 4,554,666 A | 11/1985 | Altman |
| 4,596,018 A | 6/1986 | Gruber et al. |
| 4,614,913 A | 9/1986 | Honeycutt et al. |
| 4,652,722 A | 3/1987 | Stone et al. |
| 4,655,547 A | 4/1987 | Heritage et al. |
| 4,660,209 A | 4/1987 | Osada et al. |
| 4,665,607 A | 5/1987 | Ressencourt |
| 4,672,620 A | 6/1987 | Slusher et al. |
| 4,689,467 A | 8/1987 | Inoue |
| 4,720,618 A | 1/1988 | Stamer et al. |
| 4,727,235 A | 2/1988 | Stamer et al. |
| 4,744,090 A | 5/1988 | Freiberg |
| 4,770,482 A | 9/1988 | Sweeney et al. |
| 4,779,278 A | 10/1988 | McKinney |
| 4,819,246 A | 4/1989 | Aiello et al. |
| 4,831,333 A | 5/1989 | Welch |
| 4,845,716 A | 7/1989 | Poehler et al. |
| 4,846,550 A | 7/1989 | Schuma et al. |
| 4,856,007 A | 8/1989 | Weiss |
| 4,858,240 A | 8/1989 | Pohler et al. |
| 4,907,240 A | 3/1990 | Klingel |
| 4,912,718 A | 3/1990 | Klingel |
| 4,953,176 A | 8/1990 | Ekstrand |
| 4,958,900 A | 9/1990 | Ortiz, Jr. |
| 4,991,149 A | 2/1991 | Maccabee |
| 5,001,718 A | 3/1991 | Burrows et al. |
| 5,012,259 A | 4/1991 | Hattori et al. |
| 5,023,886 A | 6/1991 | Hobart et al. |
| 5,052,017 A | 9/1991 | Hobart et al. |
| 5,065,405 A | 11/1991 | Laakmann et al. |
| 5,097,481 A | 3/1992 | Fritzsche et al. |
| 5,109,149 A | 4/1992 | Leung |
| 5,115,446 A | 5/1992 | Von Borstel et al. |
| 5,162,940 A | 11/1992 | Brandelik |
| 5,199,042 A | 3/1993 | Papetti et al. |
| 5,214,658 A | 5/1993 | Ostler |
| 5,229,573 A | 7/1993 | Stone et al. |
| 5,229,574 A | 7/1993 | Stone |
| 5,268,921 A | 12/1993 | McLellan |
| 5,274,661 A | 12/1993 | von Gunten et al. |
| 5,294,774 A | 3/1994 | Stone |
| 5,337,325 A | 8/1994 | Hwang |
| 5,339,737 A | 8/1994 | Lewis et al. |
| 5,386,427 A | 1/1995 | Zayhowski |
| 5,386,431 A | 1/1995 | Tulip |
| 5,422,906 A | 6/1995 | Karasaki et al. |
| 5,426,659 A | 6/1995 | Sugiyama et al. |
| 5,431,199 A | 7/1995 | Benjay et al. |
| 5,504,763 A | 4/1996 | Bischel et al. |
| 5,506,858 A | 4/1996 | Takenaka et al. |
| 5,544,186 A | 8/1996 | Sauer et al. |
| 5,550,853 A | 8/1996 | Ostler |
| 5,568,306 A | 10/1996 | Mandel |
| 5,572,538 A | 11/1996 | Saitoh et al. |
| 5,592,504 A | 1/1997 | Cameron |
| 5,596,594 A | 1/1997 | Egawa |
| RE35,446 E | 2/1997 | Stone |
| 5,608,754 A | 3/1997 | Murakami et al. |
| 5,646,907 A | 7/1997 | Maccabee |
| 5,653,900 A | 8/1997 | Clement et al. |
| 5,659,561 A | 8/1997 | Torruellas et al. |
| 5,670,064 A | 9/1997 | Nakata |
| 5,682,262 A | 10/1997 | Wefers et al. |
| 5,689,363 A | 11/1997 | Dane et al. |
| 5,706,305 A | 1/1998 | Yamane et al. |
| 5,720,894 A | 2/1998 | Neev et al. |
| 5,729,568 A | 3/1998 | Opower et al. |
| 5,767,477 A | 6/1998 | Sutter, Jr. |
| 5,808,268 A | 9/1998 | Balz et al. |
| 5,815,523 A | 9/1998 | Morris |
| 5,837,962 A | 11/1998 | Overbeck |
| 5,864,430 A | 1/1999 | Dickey et al. |
| 5,884,588 A | 3/1999 | Ap et al. |
| 5,929,337 A | 7/1999 | Collins et al. |
| 5,982,803 A | 11/1999 | Sukhman et al. |
| 6,050,486 A | 4/2000 | French et al. |
| 6,057,871 A | 5/2000 | Peterson |
| 6,064,034 A | 5/2000 | Rieck |
| 6,069,843 A | 5/2000 | DiMarzio et al. |
| 6,122,562 A | 9/2000 | Kinney et al. |
| 6,141,030 A | 10/2000 | Fujita et al. |
| 6,180,913 B1 | 1/2001 | Kolmeder et al. |
| 6,181,728 B1 | 1/2001 | Cordingley et al. |
| 6,192,061 B1 | 2/2001 | Hart et al. |
| 6,210,401 B1 | 4/2001 | Lai |
| 6,229,940 B1 | 5/2001 | Rice et al. |
| 6,256,121 B1 | 7/2001 | Lizotte et al. |

(56) References Cited

U.S. PATENT DOCUMENTS

| | | |
|---|---|---|
| 6,263,007 B1 | 7/2001 | Tang |
| 6,269,111 B1 | 7/2001 | Mori et al. |
| 6,303,930 B1 | 10/2001 | Hagiwara |
| 6,310,701 B1 | 10/2001 | Lizotte |
| 6,313,957 B1 | 11/2001 | Heemstra et al. |
| 6,341,042 B1 | 1/2002 | Matsunaka et al. |
| 6,356,575 B1 | 3/2002 | Fukumoto |
| 6,370,884 B1 | 4/2002 | Kelada |
| 6,420,675 B1 | 7/2002 | Lizotte et al. |
| 6,421,159 B1 | 7/2002 | Sutter et al. |
| 6,476,350 B1 | 11/2002 | Grandjean et al. |
| 6,495,795 B2 | 12/2002 | Gortler et al. |
| 6,512,781 B1 | 1/2003 | Von Borstel et al. |
| 6,539,045 B1 | 3/2003 | Von Borstel et al. |
| 6,621,838 B2 | 9/2003 | Naito et al. |
| 6,661,568 B2 | 12/2003 | Hollemann et al. |
| 6,690,702 B1 | 2/2004 | Ohmi et al. |
| 6,693,930 B1 | 2/2004 | Chuang et al. |
| 6,768,765 B1 | 7/2004 | Schroeder et al. |
| 6,791,592 B2 | 9/2004 | Assa et al. |
| 6,829,000 B2 | 12/2004 | Assa et al. |
| 6,856,509 B2 | 2/2005 | Lin |
| 6,861,614 B1 | 3/2005 | Tanabe et al. |
| 6,898,216 B1 | 5/2005 | Kleinschmidt |
| 6,915,654 B2 | 7/2005 | Johnson |
| 6,944,201 B2 | 9/2005 | Bunting et al. |
| 7,046,267 B2 | 5/2006 | Franklin et al. |
| 7,058,100 B2 | 6/2006 | Vetrovec et al. |
| 7,167,194 B2 | 1/2007 | Assa et al. |
| 7,170,251 B2 | 1/2007 | Huang |
| 7,190,144 B2 | 3/2007 | Huang |
| 7,200,464 B2 | 4/2007 | Nussbaum et al. |
| 7,291,999 B2 | 11/2007 | Huang |
| 7,331,512 B2 | 2/2008 | Caiger |
| 7,334,744 B1 | 2/2008 | Dawson |
| 7,346,427 B2 | 3/2008 | Hillam et al. |
| 7,394,479 B2 | 7/2008 | Assa et al. |
| 7,421,308 B2 | 9/2008 | Nussbaum et al. |
| 7,496,831 B2 | 2/2009 | Dutta et al. |
| 7,521,649 B2 | 4/2009 | Umetsu et al. |
| 7,521,651 B2 | 4/2009 | Gross et al. |
| 7,543,912 B2 | 6/2009 | Anderson et al. |
| 7,565,705 B2 | 7/2009 | Elkins et al. |
| 8,164,025 B1 | 4/2012 | Kunas et al. |
| 8,168,921 B1 | 5/2012 | Kunas et al. |
| 8,212,178 B1 | 7/2012 | Kunas et al. |
| 8,263,898 B2 | 9/2012 | Alber |
| 2001/0030983 A1 | 10/2001 | Yuri et al. |
| 2001/0045418 A1 | 11/2001 | Brandinger et al. |
| 2002/0021730 A1 | 2/2002 | Schroeder et al. |
| 2002/0071466 A1 | 6/2002 | Zeller |
| 2002/0080845 A1 | 6/2002 | Schulz et al. |
| 2002/0114362 A1 | 8/2002 | Vogler et al. |
| 2002/0162825 A1 | 11/2002 | Lizotte et al. |
| 2002/0196534 A1 | 12/2002 | Lizotte et al. |
| 2003/0010420 A1 | 1/2003 | Morrow |
| 2003/0014895 A1 | 1/2003 | Lizotte |
| 2003/0019854 A1 | 1/2003 | Gross et al. |
| 2003/0123040 A1 | 7/2003 | Almogy |
| 2003/0147443 A1 | 8/2003 | Backus |
| 2003/0168434 A1 | 9/2003 | Gross et al. |
| 2003/0174741 A1 | 9/2003 | Weingarten et al. |
| 2003/0219056 A1 | 11/2003 | Yager et al. |
| 2003/0219094 A1* | 11/2003 | Basting ............... G03F 7/70025 378/34 |
| 2004/0021054 A1 | 2/2004 | Bennett |
| 2004/0027630 A1 | 2/2004 | Lizotte |
| 2004/0028108 A1 | 2/2004 | Govorkov et al. |
| 2004/0066825 A1 | 4/2004 | Hayashikawa et al. |
| 2004/0104270 A1* | 6/2004 | Acosta ............... G06K 7/10683 235/462.38 |
| 2004/0119979 A1 | 6/2004 | Duarte et al. |
| 2004/0179570 A1 | 9/2004 | Vitruk et al. |
| 2004/0202220 A1 | 10/2004 | Hua et al. |
| 2004/0228004 A1 | 11/2004 | Sercel et al. |
| 2004/0232125 A1 | 11/2004 | Clauer et al. |
| 2005/0013328 A1 | 1/2005 | Jurgensen |
| 2005/0056626 A1 | 3/2005 | Gross et al. |
| 2005/0059265 A1 | 3/2005 | Im |
| 2005/0068538 A1 | 3/2005 | Rao et al. |
| 2005/0092722 A1 | 5/2005 | Dane et al. |
| 2005/0094684 A1 | 5/2005 | Hermann et al. |
| 2005/0094697 A1 | 5/2005 | Armier et al. |
| 2005/0107773 A1 | 5/2005 | Bergt et al. |
| 2005/0111496 A1 | 5/2005 | Reeder et al. |
| 2005/0111500 A1 | 5/2005 | Harter et al. |
| 2005/0111514 A1 | 5/2005 | Matsumoto et al. |
| 2005/0157762 A1 | 7/2005 | DeMaria et al. |
| 2005/0190809 A1 | 9/2005 | Petersen et al. |
| 2005/0202611 A1 | 9/2005 | Mitsuhashi et al. |
| 2005/0205778 A1 | 9/2005 | Kitai et al. |
| 2005/0220164 A1 | 10/2005 | Mori et al. |
| 2005/0226286 A1 | 10/2005 | Liu et al. |
| 2005/0226287 A1 | 10/2005 | Shah et al. |
| 2006/0044981 A1 | 3/2006 | Egawa et al. |
| 2006/0061854 A1 | 3/2006 | Dane et al. |
| 2006/0092522 A1 | 5/2006 | Lizotte |
| 2006/0092995 A1 | 5/2006 | Frankel et al. |
| 2006/0108097 A1 | 5/2006 | Hodes et al. |
| 2006/0114947 A1 | 6/2006 | Morita |
| 2006/0114956 A1 | 6/2006 | Sandstrom et al. |
| 2006/0161381 A1 | 7/2006 | Jetter |
| 2006/0191063 A1 | 8/2006 | Elkins et al. |
| 2006/0227841 A1 | 10/2006 | Savich |
| 2006/0245084 A1 | 11/2006 | Brustle et al. |
| 2006/0249491 A1 | 11/2006 | Jurgensen |
| 2006/0266742 A1 | 11/2006 | Hall et al. |
| 2006/0287697 A1 | 12/2006 | Lennox |
| 2007/0029289 A1 | 2/2007 | Brown |
| 2007/0030875 A1 | 2/2007 | Takazane et al. |
| 2007/0086493 A1 | 4/2007 | Apolonski et al. |
| 2007/0098024 A1 | 5/2007 | Mitchell |
| 2007/0138151 A1 | 6/2007 | Tanaka et al. |
| 2007/0177260 A1 | 8/2007 | Kuppenheimer et al. |
| 2007/0205186 A1 | 9/2007 | Kitai et al. |
| 2007/0235458 A1 | 10/2007 | Hewkin |
| 2007/0247499 A1 | 10/2007 | Anderson et al. |
| 2007/0295974 A1 | 12/2007 | Fontanella et al. |
| 2008/0042042 A1 | 2/2008 | King et al. |
| 2008/0043791 A1 | 2/2008 | Miyajima et al. |
| 2008/0043799 A1 | 2/2008 | Egawa et al. |
| 2008/0094636 A1 | 4/2008 | Jin et al. |
| 2008/0253415 A1 | 10/2008 | Livingston |
| 2008/0253417 A1 | 10/2008 | Livingston |
| 2008/0279247 A1 | 11/2008 | Scholz et al. |
| 2008/0297912 A1 | 12/2008 | Baldwin |
| 2009/0010285 A1 | 1/2009 | Dubois et al. |
| 2009/0027753 A1 | 1/2009 | Lizotte |
| 2009/0185176 A1 | 7/2009 | Livingston et al. |
| 2009/0185590 A1 | 7/2009 | Livingston |
| 2009/0188901 A1 | 7/2009 | Dantus |
| 2009/0207478 A1 | 8/2009 | Oron et al. |
| 2009/0245318 A1 | 10/2009 | Clifford, Jr. |
| 2009/0312676 A1 | 12/2009 | Rousso et al. |
| 2009/0323739 A1 | 12/2009 | Elliott et al. |
| 2009/0323753 A1 | 12/2009 | Gmeiner et al. |
| 2010/0132817 A1 | 6/2010 | Hewkin |
| 2010/0206882 A1 | 8/2010 | Wessels et al. |
| 2010/0220750 A1 | 9/2010 | Brownell |
| 2010/0254415 A1 | 10/2010 | Oh et al. |
| 2011/0032602 A1 | 2/2011 | Rothenberg |
| 2011/0032603 A1 | 2/2011 | Rothenberg |
| 2011/0032604 A1 | 2/2011 | Rothenberg et al. |
| 2011/0043899 A1 | 2/2011 | Erlandson |
| 2011/0097906 A1 | 4/2011 | Kwon et al. |
| 2011/0102537 A1 | 5/2011 | Griffin et al. |
| 2011/0127241 A1 | 6/2011 | Rumsby |
| 2011/0127697 A1 | 6/2011 | Milne |
| 2011/0128500 A1 | 6/2011 | Bille |
| 2011/0227972 A1 | 9/2011 | Taniguchi et al. |
| 2011/0253690 A1 | 10/2011 | Dane et al. |
| 2011/0255088 A1 | 10/2011 | Dane et al. |
| 2011/0259631 A1 | 10/2011 | Rumsby |
| 2011/0266264 A1 | 11/2011 | Rumsby |

(56) References Cited

U.S. PATENT DOCUMENTS

| | | |
|---|---|---|
| 2011/0286480 A1 | 11/2011 | Bayramian |
| 2012/0106083 A1 | 5/2012 | Toftloekke et al. |
| 2014/0204713 A1 | 7/2014 | Armbruster et al. |
| 2014/0224778 A1 | 8/2014 | Armbruster et al. |

FOREIGN PATENT DOCUMENTS

| | | |
|---|---|---|
| DE | 10125447 A1 | 1/2002 |
| EP | 0157546 A2 | 10/1985 |
| EP | 0427229 A3 | 5/1991 |
| EP | 1184946 A1 | 3/2002 |
| EP | 2565673 A1 | 3/2012 |
| GB | 1495477 A | 12/1977 |
| GB | 2211019 A | 6/1989 |
| GB | 2249843 A | 5/1992 |
| GB | 2304641 A | 3/1997 |
| JP | 63094695 A | 4/1988 |
| JP | 5129678 A | 5/1993 |
| JP | 2001276986 A | 10/2001 |
| JP | 2007032869 A | 2/2007 |
| JP | 2007212118 A | 8/2007 |
| JP | 2011156574 A | 8/2011 |
| WO | 0046891 A1 | 8/2000 |
| WO | 0107865 A2 | 2/2001 |
| WO | 0243197 A2 | 5/2002 |
| WO | 2013034210 A1 | 3/2013 |

OTHER PUBLICATIONS

Final Office Action for U.S. Appl. No. 14/342,477, dated Mar. 22, 2016, 17 pages.
Final Office Action for U.S. Appl. No. 14/342,495, dated Apr. 12, 2016, 25 pages.
Final Office Action for U.S. Appl. No. 14/342,481, dated Apr. 26, 2016, 24 pages.
Final Office Action for U.S. Appl. No. 14/342,499, dated Apr. 26, 2016, 21 pages.
U.S. Appl. No. 14/342,503, Final Office Action dated Dec. 18, 2014, 22 pages.
Office Action for U.S. Appl. No. 14/342,494, dated Oct. 2, 2015, 47 pages.
Notice of Allowance and Fee(s) Due for U.S. Appl. No. 14/342,487, dated Nov. 23, 2015, 47 pages.
Office Action for U.S. Appl. No. 14/342,481, dated Oct. 6, 2015, 77 pages.
Office Action for U.S. Appl. No. 14/342,477, dated Oct. 7, 2015, 74 pages.
Office Action for U.S. Appl. No. 14/342,495, dated Oct. 6, 2015, 77 pages.
Office Action for U.S. Appl. No. 14/342,499, dated Oct. 6, 2015, 77 pages.
U.S. Appl. No. 14/342,493, Office Action dated Nov. 19, 2014.
U.S. Appl. No. 14/342,510, Office Action dated Aug. 1, 2014.
U.S. Appl. No. 14/342,508, Office Action dated Aug. 14, 2014.
U.S. Appl. No. 14/342,503, Office Action dated Aug. 21, 2014.
U.S. Appl. No. 14/342,487, Office Action dated Aug. 14, 2014.
U.S. Appl. No. 14/342,483, Office Action dated Oct. 2, 2014.
International Application No. PCT/EP2012/003073, Preliminary Report on Patentability, Sep. 26, 2013, 14 pages.
International Application No. PCT/EP2012/003072, Preliminary Report on Patentability, Mar. 12, 2014, 7 pages.
International Application No. PCT/EP2012/003071, Preliminary Report on Patentability, Mar. 12, 2014, 5 pages.
International Application No. PCT/EP2012/003070, Preliminary Report on Patentability, Mar. 12, 2014, 7 pages.
International Application No. PCT/EP2012/003069, Preliminary Report on Patentability, Nov. 27, 2013, 32 pages.
International Application No. PCT/EP2012/003068, Preliminary Report on Patentability, Mar. 12, 2014, 5 pages.
International Application No. PCT/EP2012/003067, Preliminary Report on Patentability, Nov. 28, 2013, 19 pages.
International Application No. PCT/EP2012/003066, Preliminary Report on Patentability, Nov. 28, 2013, 19 pages.
International Application No. PCT/EP2012/003065, Preliminary Report on Patentability, Nov. 28, 2013, 21 pages.
International Application No. PCT/EP2012/003064, Preliminary Report on Patentability, Nov. 15, 2013, 18 pages.
International Application No. PCT/EP2012/003063, Preliminary Report on Patentability, Mar. 12, 2014, 5 pages.
International Application No. PCT/EP2012/003062, Preliminary Report on Patentability, Mar. 12, 2014, 6 pages.
International Application No. PCT/EP2012/003061, Preliminary Report on Patentability, Mar. 12, 2014, 6 pages.
International Application No. PCT/EP2012/003073, Search Report and Written Opinion, Dec. 18, 2012, 8 pages.
International Application No. PCT/EP2012/003072, Search Report and Written Opinion, Oct. 8, 2012, 11 pages.
International Application No. PCT/EP2012/003071, Search Report and Written Opinion, Nov. 15, 2012, 9 pages.
International Application No. PCT/EP2012/003070, Search Report and Written Opinion, Oct. 8, 2012, 11 pages.
International Application No. PCT/EP2012/003069, Search Report and Written Opinion, Sep. 27, 2012, 8 pages.
International Application No. PCT/EP2012/003068, Search Report and Written Opinion, Nov. 15, 2012, 8 pages.
International Application No. PCT/EP2012/003067, Search Report and Written Opinion, Nov. 16, 2012, 7 pages.
International Application No. PCT/EP2012/003066, Search Report and Written Opinion, Nov. 15, 2012, 7 pages.
International Application No. PCT/EP2012/003065, Search Report and Written Opinion, Nov. 16, 2012, 7 pages.
International Application No. PCT/EP2012/003064, Search Report and Written Opinion, Nov. 16, 2012, 7 pages.
International Application No. PCT/EP2012/003063, Search Report and Written Opinion, Nov. 15, 2012, 9 pages.
International Application No. PCT/EP2012/003062, Search Report and Written Opinion, Nov. 15, 2012, 10 pages.
International Application No. PCT/EP2012/003061, Search Report and Written Opinion, Sep. 10, 2012, 9 pages.
U.S. Appl. No. 14/342,508, Final Office Action dated Dec. 10, 2014, 23 pages.
Final Office Action for U.S. Appl. No. 14/342,487, dated Feb. 2, 2015, 31 pages.
Notice of Allowance and Fee(s) Due for U.S. Appl. No. 14/342,510, dated Feb. 20, 2015, 20 pages.
Notice of Allowance and Fee(s) Due for U.S. Appl. No. 14/342,503, dated Mar. 17, 2015, 11 pages.
Notice of Allowance and Fee(s) Due for U.S. Appl. No. 14/342,508, dated Apr. 1, 2015, 15 pages.
Notice of Allowance and Fee(s) Due for U.S. Appl. No. 14/342,483, dated Apr. 2, 2015, 26 pages.
Final Office Action for U.S. Appl. No. 14/342,493, dated Apr. 21, 2015, 25 pages.
Office Action for U.S. Appl. No. 14/342,487, dated Jul. 24, 2015, 17 pages.
Notice of Allowance and Fee(s) Due for U.S. Appl. No. 14/342,493, dated Jun. 24, 2015, 11 pages.
U.S. Appl. No. 14/342,505, Office Action 1 dated Jun. 3, 2016, 83 pages.
U.S. Appl. No. 14/342,481, Office Action 2 dated Aug. 17, 2016, 24 pages.
U.S. Appl. No. 14/342,495, Office Action 2 dated Aug. 17, 2016, 22 pages.
U.S. Appl. No. 14/342,499, Office Action 2 dated Aug. 17, 2016, 21 pages.
U.S. Appl. No. 14/342,477, Office Action 2 dated Aug. 18, 2016, 27 pages.
U.S. Appl. No. 14/342,505, Final Office Action 1 dated Nov. 14, 2016, 19 pages.
U.S. Appl. No. 14/342,499, Notice of Allowance dated Dec. 5, 2016, 12 pages.

(56) References Cited

OTHER PUBLICATIONS

U.S. Appl. No. 14/342,481, Notice of Allowance dated Dec. 5, 2016, 12 pages.
U.S. Appl. No. 14/342,495, Notice of Allowance dated Dec. 8, 2016, 14 pages.
U.S. Appl. No. 14/342,477, Notice of Allowance dated Dec. 22, 2016, 19 pages.

* cited by examiner

LASER DEVICE AND METHOD FOR MARKING AN OBJECT

FIELD OF THE INVENTION

The invention refers to a laser device and a method for marking an object.

RELATED ART

There are known laser devices in the state of the art having a plurality of gas discharge conduits, commonly tubular in shape and referred to as resonator tubes or tubes, which are folded, as shown in FIG. 1. The folded design provides a long tubular space formed by the tubes. As the output power of a laser device is determined by the length of the tubular space, in particular the distance between a rear mirror and an output coupler, this laser design can provide a considerable output power. Such a laser can for example be used for marking an object with a laser beam coupled out by the laser device.

U.S. Pat. No. 5,115,446 discloses a carrying structure for the flanges and other elements of two laser beam paths. The carrying structure has a geometric central plane zone that lies between and parallel to geometric central plane zones of the two laser beam paths so that the carrying structure includes the flanges of the first and second laser beam paths.

SUMMARY OF THE INVENTION

It is an object of this invention to provide a laser device, in particular for marking an object, which is compact and provides a good marking quality. It is a further object to provide an economical method for marking an object.

The object is solved according to the invention by a laser device and a method.

The laser device according to the invention comprises at least two laser units, which are stacked in layers, each laser unit being configured to emit a laser beam, and each laser unit comprising: a plurality of resonator tubes for a gas to be excited, the resonator tubes being mechanically connected to each other and forming a common tubular space, connecting elements for connecting adjacent resonator tubes, excitation means for the resonator tubes for exciting the gas in the resonator tubes for generating a laser light, mirrors arranged in the connecting elements for reflecting the laser light between the resonator tubes, a totally reflecting rear mirror, and a partially reflecting output coupler for coupling out a laser beam.

The method for marking an object is carried out with a laser device as described above. The laser beams of the laser units are directed to a free central space surrounded by the resonator tubes. In the free central space one or more deflecting means may be arranged to deflect the laser beams to the region of the object to be marked.

The inventive laser device can be a gas laser and in particular a $CO_2$ laser device, wherein the gas in the resonator or resonator tubes includes $CO_2$.

The laser device can in particular be a marking head, and it may be used for marking or engraving an object with a laser beam. The tubes of the laser units each form a common tubular space, which may also be referred to as a resonator of the laser unit. In other words the laser units comprise in each case a resonator including a plurality of tubes which may be in fluidic communication, that is fluidically connected with each other.

An excitable gas is received in the resonators. The gas is excited by means of excitation means in order to generate laser light within the resonators and the resonator tubes, respectively.

The rear mirror, in some embodiments a totally reflecting mirror, is arranged at a first end of the common tubular space of a laser unit. The output coupler, in some embodiments a partially reflecting mirror, is arranged at an opposite second end of the common tubular space of the laser unit. Hence, the resonator is defined at opposite axial ends by the rear mirror and the output coupler. A part of the laser light in the tubular space is coupled out as the laser beam through the output coupler.

One idea of the invention is to provide a laser device having a plurality of individual laser units, each having a laser beam output for a laser beam. Therefore, the laser units constitute basic building blocks of a multi-beam laser. The laser units are stacked on top of each other, thereby providing an array of laser units. The array of laser units permits to create a dot-matrix mark on an object to be marked. Depending on the number of stacked laser units, any number of dots or lines of code can be produced. The stacked laser units may provide a monolithic linear array.

Each laser unit has an individual laser beam output. The laser outputs of the individual laser units may be arranged in a linear array or line.

It may be preferred according to the invention that the laser units are basically two-dimensional structures or flat units in which the gas discharge conduits are arranged in a single plane. The two-dimensional geometric form of the laser units as the core building blocks of the laser device allows for stacking of the blocks and, thereby, creates an array.

Accordingly, it may be preferred that the individual tubes of a laser unit are arranged in one plane. That is, the tubes of the first laser unit are arranged in a first plane and the tubes of a second laser unit are arranged in a second plane and so forth. In other words, the tubes of each laser unit may be arranged in an individual, separate plane or layer. This provides for a flat design of each laser unit, so that the laser units can be easily stacked, thereby forming a very compact laser device with a plurality of stacked laser units. Due to the flat design of the laser units, the distance between the individual laser beams can be minimized.

It may be preferred that the layer, in which the resonator tubes of at least one of the laser units are arranged, is a flat plate. The two-dimensional structure of the plate, which extends in one plane, allows for stacking of the laser units in an easy manner.

In another embodiment of the invention the partially reflecting output couplers of the laser units, which may be in particular partially reflecting mirrors, are configured to emit parallel laser beams. The parallel laser beams coupled out of the laser units may be further deflected by deflection means in order to provide a desired shape and/or resolution of a marking to be applied on an object.

The power of a laser device may be fundamentally determined by the length of the tubular space or resonator, which forms a cavity of the laser device in which the laser light is reflected between a rear mirror at one end and a partially reflecting output coupler at the opposite end. In order to provide a compact and powerful laser device, it may be preferred that the resonator tubes containing the gas discharge of each laser unit are arranged in the shape of an open or closed ring surrounding a free central space between them. Due to the ring-shaped pattern of the resonator tubes, the free space is at least partly surrounded by the tubes. In particular, the free space may be defined on at least two side faces by the tubes and it is accessible via at least one or both of the head faces.

By folding the resonator around a free central space, the length of the resonator may be increased without increasing the overall length of the laser device, as compared to a linear resonator. Moreover, the ring-shaped pattern provides a free space within the laser device, in which additional components of the laser device may be placed. Such additional components may for example be electronic components such as drivers for the excitation means, lenses, or additional mirrors for the deflection of the laser beams. Such components are safely received in the free cavity in the center of the laser device. The ring-shaped arrangement also allows for an effective cooling of the tubes.

For providing the free space in a center area of the laser device, the tubes are arranged in the form of a circuit or ring which defines the free space. The tubes may in particular be straight tubes, that is, they have a longitudinal axis extending along a straight line, and corner areas are formed between adjacent tubes. Therefore, the form of the resonator of one laser unit may also be described as an angled ring, which may either be a closed ring in the form of a loop or an open ring having a gap between two of its tubes.

According to embodiments of the invention the angle which is formed between each two adjacent laser tubes of a laser unit may be greater than in a typical folded design of the laser tubes, as shown for example in FIG. 1. It may be preferred that the angle is greater than 60°, in some cases at least 90°. It may also be preferred according to the invention that the angles formed between two adjacent tubes are equal.

Connecting elements or corner flanges are arranged in the corners between the resonator tubes of each laser unit and are connected in each case to two adjacent tubes. The mirrors for coupling laser light between the tubes are received within the connecting elements. The connecting elements or corner flanges, which may also be called intermediate corner flanges, may include a ceramic material. In addition, there may be end flanges in each laser unit connected to the tubes at the opposite axial ends of the common tubular space. The end flanges contain the output coupler and a rear mirror, respectively.

A compact laser device, in particular for marking an object, is achieved in that the laser units are configured to emit their laser beams into the free central space surrounded by the resonator tubes. To this end, a deflecting mirror may be provided at each laser unit which deflects the laser beam passing through the output coupler in the direction of the free central space. The deflecting mirror, which may also be referred to as an output mirror is preferentially arranged outside the resonator of the respective laser unit. Instead of a plurality of individual output mirrors also a common output mirror for a plurality of laser units may be provided.

An advantage of the deflection of the laser beam towards the space enclosed by the resonator tubes is that additional components of the laser device such as lenses or additional mirrors for deflecting and/or rearranging the laser beams may be placed within the laser device, thereby providing a very compact design.

In an embodiment of the invention the resonator tubes of each laser unit are arranged in a triangular, rectangular, square or U-pattern. In a triangular pattern the resonator of each laser unit includes three laser tubes, whereas in the rectangular or square pattern the resonator is made-up of four resonator tubes. In other embodiments five or more tubes may be provided and arranged in a polygonal form. The inventive design of the laser units with a ring-like arrangement of the tubes allows the geometry of the resonator to be optimized, for example to the power required and the volume limitation of the particular application. The U-pattern as an embodiment of an open ring or circuit can have a lower height and therefore fit into applications where height is an integration constraint.

In another embodiment the individual laser units have equal forms. The equal forms or shapes of the laser units allow for an easy stacking of the laser units in order to form a multi-beam laser device. Neighbouring resonator tubes of adjacent laser units may have the same length. The laser units may in particular be identically constructed.

In yet another embodiment a plurality of mapping mirrors are arranged in the free central space for reducing the spacing between the laser beams of the individual laser units and/or rearranging the laser beams. It may be preferred that at least one mapping mirror per laser unit is provided.

In another embodiment a scanning device is provided which includes at least one movable mirror for deflecting the laser beams coupled out through the output couplers of the laser units into predetermined directions. The scanning device may include one or more mirrors for all laser beams of the laser units together.

In an embodiment the scanning device is arranged in the free central space surrounded by the resonator tubes. This provides a compact laser device in which the scanning device is safely received in the free central space surrounded by the resonator tubes. The scanning device redirects the laser beams through an opening from the inside of the laser device to an outside of the laser device, in particular for marking an object located outside the laser device.

For providing the common tubular space of each laser unit it may be preferred according to the invention that the connecting elements of the laser units each comprise a inner cavity which may be in fluidic communication with the at least two adjacent resonator tubes of the respective laser unit connected to the connecting element. The inner cavity may have a tubular or pipe-like form with a first axial opening at a first axial end and a second axial opening at a second axial end of the cavity. The first axial end of the cavity can be connected to a first resonator tube and the second axial end of the cavity can be connected to a second resonator tube. In addition the inner cavity formed in the connecting flange may have a third opening in a corner portion to which a mirror may be attached for reflecting laser light between the resonator tubes.

The connecting elements or corner pieces of each laser unit may be stacked on top of each other and connected by connecting means. However, in an embodiment a plurality of connecting elements of the laser units are integrated into a common support structure formed in a corner area or edge of the laser device. They form corner pieces or corner elements. A single base body of the common support structure may extend across several laser units. The integrated corner structures reduce cost and manufacturing time.

In an embodiment of the invention the resonator tubes of each laser unit are arranged in a loop and each laser unit includes an integrated output flange connected between two resonator tubes, the integrated output flange comprising the output coupler and the rear mirror of the respective laser unit. The closed loop or ring of the laser units enhances the stability and provides a particularly compact design. The integrated output flange is arranged at a corner between two resonator tubes of each laser unit. These resonator tubes may be referred to as end resonator tubes of the common tubular space of a laser unit. The integrated output flange, which may also be referred to as a connecting element, comprises at least two mirrors, namely the rear mirror and the output coupler. The integrated output flange may or may not provide a fluidic connection between the tubes connected thereto.

In an embodiment the rear mirror of each laser unit is provided at a first face of the integrated output flange and the output coupler is provided at a second face of the integrated output flange. The second face may be angled relative to the first face. The first face may in particular be arranged perpendicularly to a first resonator tube connected to the integrated output flange and the second face may be arranged perpendicularly to a second resonator tube connected to the integrated output flange.

It may be preferred that the integrated output flange of each laser unit comprises an output mirror provided at a third face for deflecting the laser beam passing through the output coupler into a predetermined direction. The output mirror, which may in particular be a third mirror of the integrated output flange of each laser unit, may be arranged such that it deflects the laser beam coupled out through the partially reflecting output coupler into the free central space surrounded by the resonator tubes.

In an embodiment the integrated output flange of each laser unit comprises a first base body to which the end resonator tubes of the resonator are connected. The integrated output flange further comprises a second base body connected to the first base body. A spacing or gap is formed between the first and second base bodies in which at least one of the rear mirror and the output coupler is received. The rear mirror and/or the output coupler are preferably connected to the first base body in a gas-tight manner and define an axial end of the common tubular space.

The first and/or second base body includes a cavity for the laser beam coupled out through the partially reflecting output coupler. The output mirror may be connected to the second base body in a corner portion thereof and deflects the laser beam towards the central free space.

It may be preferred according to the invention that the tubular space or resonator of the laser units is in each case a closed gas system. This means in particular that the resonator of each laser unit is a completely closed cavity and that there is no constant gas flow through the resonator. The gas in the resonator, that is in the common tubular space, is only replaced in certain intervals when the laser device is out of operation. Therefore, no gas inlet and no gas outlet are provided for a constant flow of gas through the tubular space and no space is needed for equipment pumping the gas through the system.

The excitation means for at least one of the resonator tubes may include at least one electrode, in particular a radio frequency electrode. The electrode may in particular extend along the axial length of the resonator tubes. For reasons of efficiency and for uniform excitation of the gas in the resonator tube, RF inductors might be connected to the electrodes. For example, the electrode may have a helical coil design. A known problem with this solution is that the helical coil design of a RF inductor substantially increases the size of the laser and is costly.

According to the invention, a particularly compact and flat design of the laser device may be achieved in that the at least one electrode and/or the RF inductor has a planar coil design. In the planar coil design, the coil and the electrode may in particular be arranged in one single flat plane. In an embodiment the coil may be arranged in a spiral form.

It may be preferred that the excitation means for at least one of the resonator tubes include at least two electrodes extending along a longitudinal axis of the respective resonator tube. The two electrodes may in particular be arranged on opposite sides of the resonator tubes, for example there may be an upper electrode and a lower electrode, both of which extend along the length of the resonator tube.

BRIEF DESCRIPTION OF THE DRAWINGS

The invention will now be further described with reference to the attached figures, wherein.

DETAILED DESCRIPTION OF THE INVENTION

In all Figures, identical or corresponding components are identified by identical reference signs.

Figure 1:
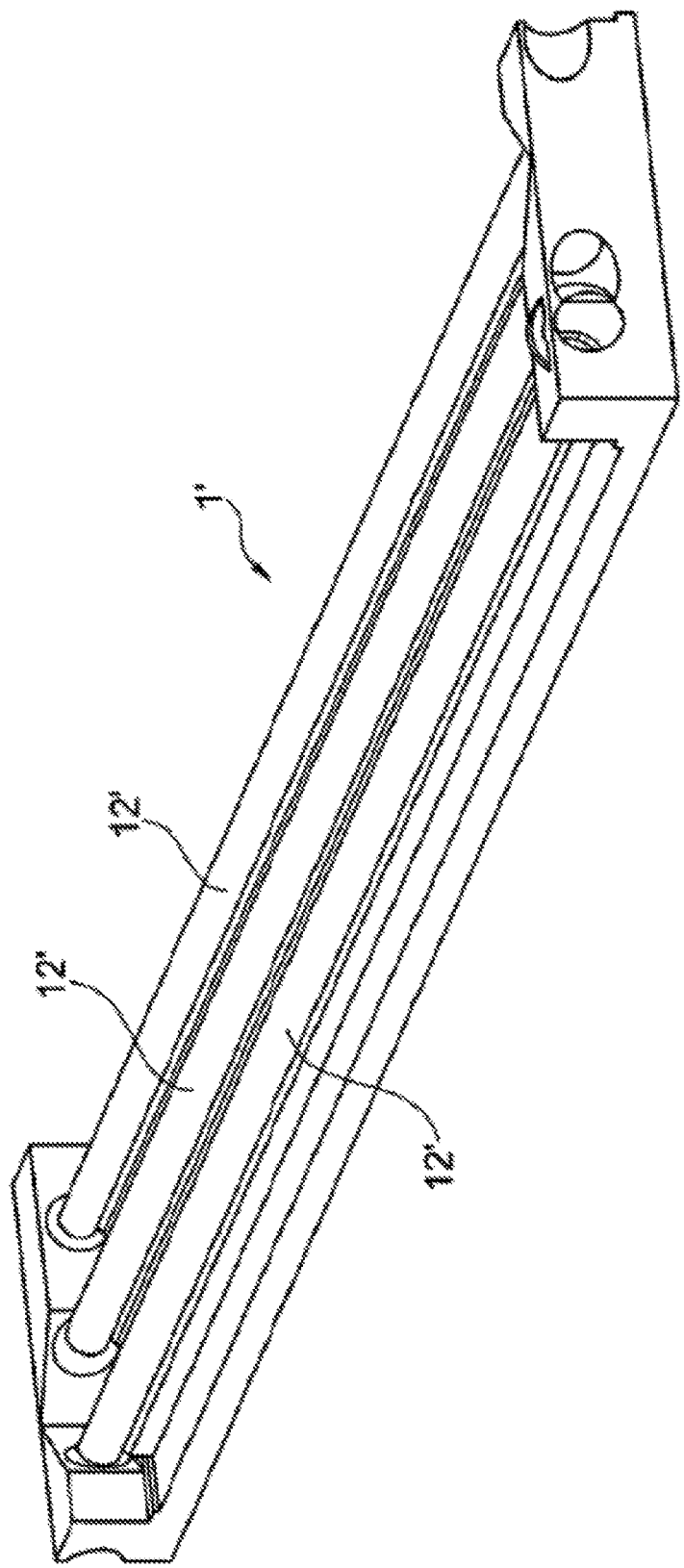
FIG. 1: shows an arrangement of resonator tubes of a laser device according to the prior art.

FIG. 1 shows a folded design of resonator tubes 12' of a laser device 1' according to the prior art. The laser device 1' includes one single laser unit which emits one single laser beam. The resonator tubes 12' are arranged closed to each other and nearly parallel in order to provide a small cross-section.

Figure 2:
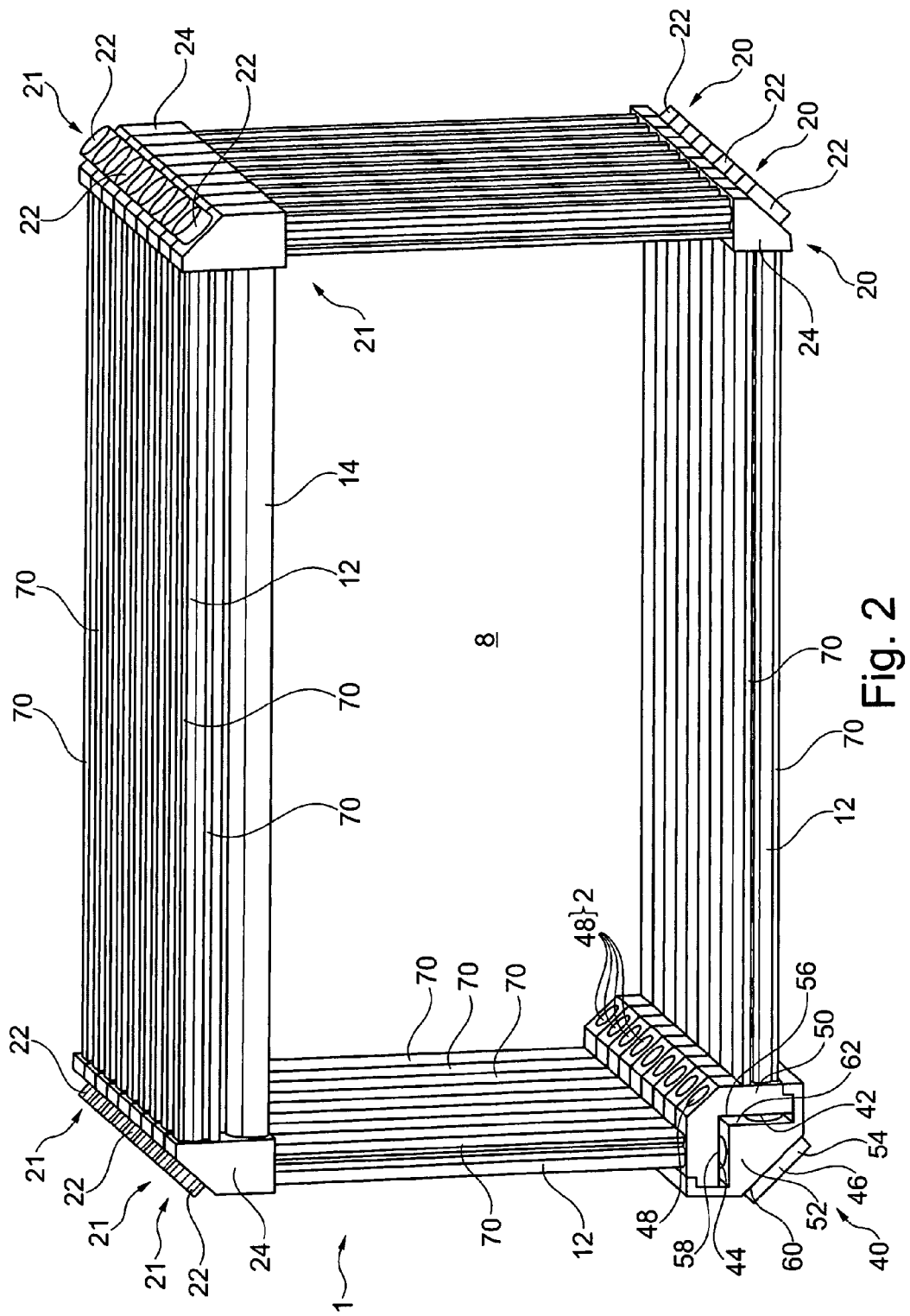
FIG. 2: shows an embodiment of a laser device according to the invention with stacked individual corner elements.

FIG. 2 shows a first embodiment of a laser device 1 according to the invention. The laser device 1 comprises a plurality of laser units 10 arranged next to each other in a parallel manner. In the shown embodiment the laser device 1 includes nine laser units 10, allowing for a resolution of nine pixels transverse to a movement direction of an object to be marked.

The laser device 1 may in particular be a laser device for marking an object by means of a plurality of laser beams. The laser device 1 may also be called a marking head for marking an object.

The individual laser units 10 each have a plurality of resonator tubes 12 which may in particular be alumina tubes. The resonator tubes 12 of a laser unit 10 form a part of a common tubular space which may be referred to as the resonator of the respective laser unit 10. The tubes 12 are at least partially enclosed by excitation means 70 in the form of radio frequency electrodes 71 for exciting a gas contained in the tubes 12. The electrodes 71 extend substantially along the entire length of the tubes 12 for exciting the gas contained therein. An inner electrode 71 may be arranged on an inner side of the tubes 12 facing the free central space 8 and an outer electrode 71 may be arranged on an outside face of the tubes 12.

The laser device 1 has the form of a cube having four side faces and two head faces. A free central space 8 is formed in an inner area of the laser device 1. The space 8 is surrounded on the side faces of the cubic laser device 1 by the resonator tubes 12 of the laser units 10.

In the shown embodiment each laser unit 10 comprises four resonator tubes 12 arranged in a square. However, instead of a square resonator the resonator may also take the shape of a rectangle, a U-shape or a triangular shape. Instead of a resonator composed of four sides it could also be constructed with only three sides or more than four sides. The design can be optimized to the power required and the volume limitation of the particular application.

The resonator tubes 12 of each laser unit 10 are arranged in individual, separate flat layers. Each of the tubes 12 has a longitudinal axis. The longitudinal axes of the tubes 12 of one laser unit 10 extend in one common plane. The laser units 10 are substantially identical and are stacked on top of each other in a parallel manner. The laser units 10 are connected to each other by suitable connecting devices, such as bolts, screws or the like.

In three of the four corners of each laser unit 10, connecting elements 20, 21, in some embodiments in the form of ceramic triangles, are arranged for connecting adjacent resonator tubes 12. Each of the connecting elements 20, 21 has a mirror 22 for reflecting laser light from one tube 12 to an adjacent tube 12, thus coupling laser energy between the tubes 12. The connecting elements 20, 21 each have a base body 24, to which tubes 12 are connected. The mirror 22 is attached to the base body 24.

Each laser unit 10 comprises a rear mirror 44 at an axial end of one of the tubes 12. Moreover, each laser unit has an output coupler 42 arranged at an axial end of another tube 12. The rear mirror 44 and the output coupler 42 form axial ends of the common tubular space, that is, the resonator of the laser unit 10. The output coupler 42 is a partially reflecting mirror which reflects a part of the laser light within the tubular space and couples out a laser beam.

The laser beam of each laser unit 10 is coupled out in a corner area of the respective laser unit 10, so that a linear array of laser beams is coupled out in a corner or edge of the cubic laser device 1. In other words the outputs of the laser units are arranged in a line along one edge of the cube, forming a multi-beam output 2 of the laser device 1.

In the illustrated embodiment of FIG. 2 two of the resonator tubes 12 of each laser unit 10, which may be called end resonator tubes, are interconnected by an integrated output flange 40. That is, the fourth corner is constructed such that one face 56 contains the rear mirror 44 and another face 58 contains the partially reflecting output coupler 42.

The integrated output flange 40 of a laser unit 10 comprises a first, inner base body 50 and a second, outer base body 52. An inner cavity or spacing 62 is formed between the first and the second base bodies 50, 52. The rear mirror 44 and the output coupler 42 are arranged in the spacing 62. The first base body 50 further includes two through-holes for receiving two adjacent tubes 12.

In a corner area of the integrated output flange 40 an output mirror 46 is provided for reflecting the laser beam coupled out through the output coupler 42 into a predetermined direction. The output mirror 46 is arranged such that the laser beam is reflected towards the free central space 8 of the laser device 1. The output mirror 46 is connected to the second base body 52 of the integrated output flange 40.

In particular, the output mirror 46 is mounted to a third face 60 which is angled relative to the first and second faces 56, 58. The third face 60 is a corner face of the second base body 52. A mounting or connecting flange 54 is provided for connecting adjacent laser units 10.

An output hole 48 is formed in the first base body 50 of the integrated output flange 40 through which the laser beam deflected by the output mirror 46 may pass into the free central space 8. The output holes 48 of the laser units 10 form individual laser outputs of the laser units 10.

Two of the connecting elements 20, 21, the connecting elements 21, have an additional inlet portion for connecting a gas reservoir tube 14. The gas reservoir tube 14 is free of excitation means and supplies additional gas ballast to the resonator tubes 12 of a laser unit 10. In an embodiment each of the laser units 10 comprises at least one gas reservoir tube 14.

The gas reservoir tube 14 of a laser unit 10 is arranged parallel to one of the resonator tubes 12. It may have different dimensions, in particular a larger diameter, than the resonator tubes 12.

Figure 3:
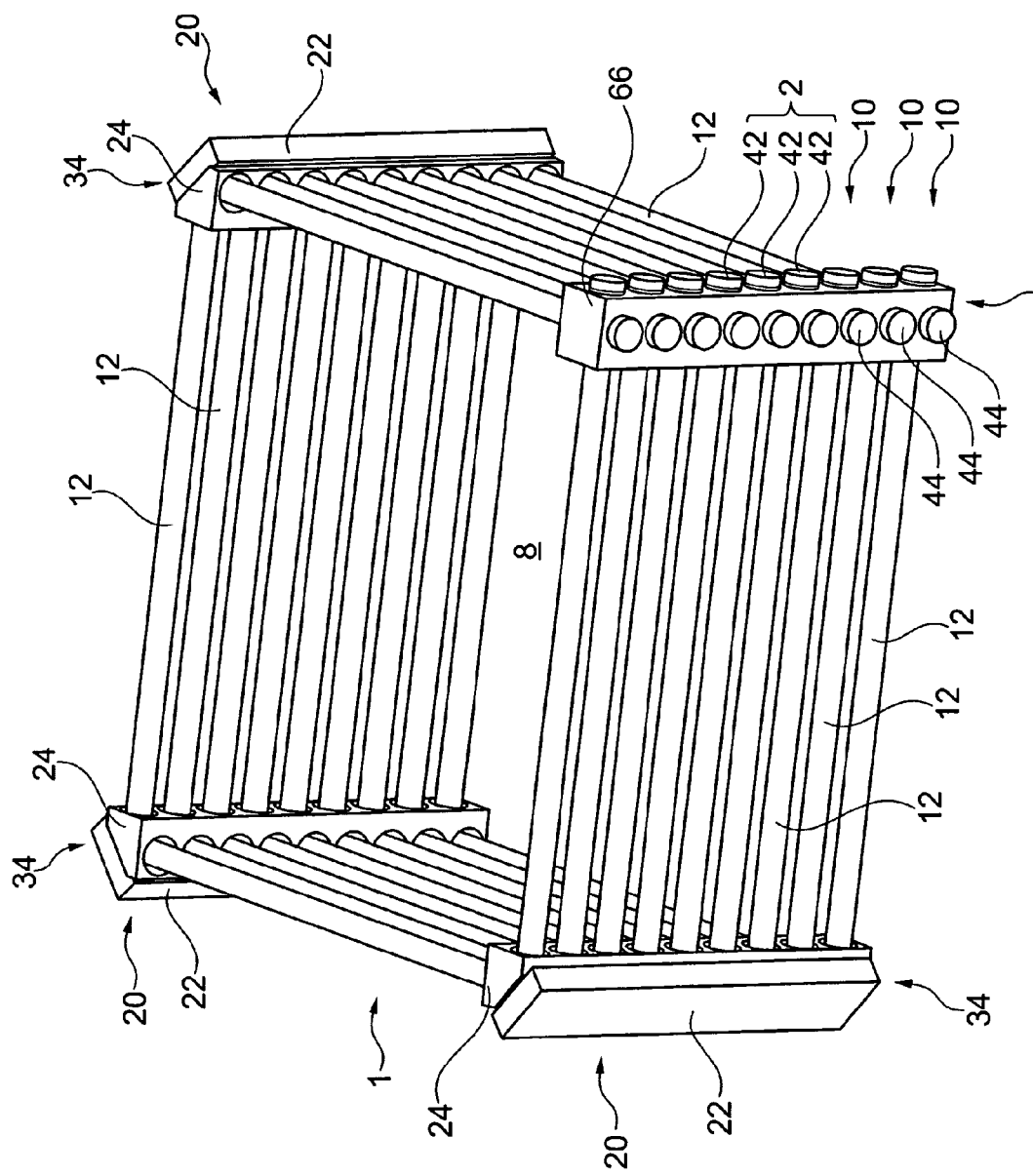
FIG. 3: shows an embodiment of a laser device according to the invention with integrated corner structures.

FIG. 3 shows a second embodiment of a laser device 1 according to the invention. This laser device 1 has no additional gas ballast tubes and the laser beams of the laser units 10 are directed towards the outside, not the free central space 8 surrounded by the resonator tubes 12. Moreover, the corner elements 20 and the integrated output flanges 40 of the individual laser units 10 are integrated into integral corner elements 34, 64 extending across several or all of the laser units 10. It is generally to be understood that features shown in the different figures of this application can also be combined.

The laser device 1 shown in FIG. 3 has three corner elements 34 arranged at edges of the cubic laser device 1 to which two resonator tubes 12 of each laser unit 10 are connected. The corner elements 34 have an integral base body 24 comprising a plurality of holes to which the resonator tubes 12 are connectable. The holes for connecting the tubes 12 are arranged in two linear arrays. A common mirror element 22 is connected to the base body 24 for coupling laser light between the resonator tubes 12 of each of the laser units 10.

In a fourth corner of the cubic laser device 1 a corner element 64 comprising a plurality of integrated output flanges 40 is arranged. The corner element 64 has an integral base body 66 extending along several or all of the laser units 10. The corner element 64 comprises a plurality of output couplers 42 and a plurality of rear mirrors 44. The base body 66 is formed of a single piece extending along an edge of the cubic laser device 1.

Figure 4:
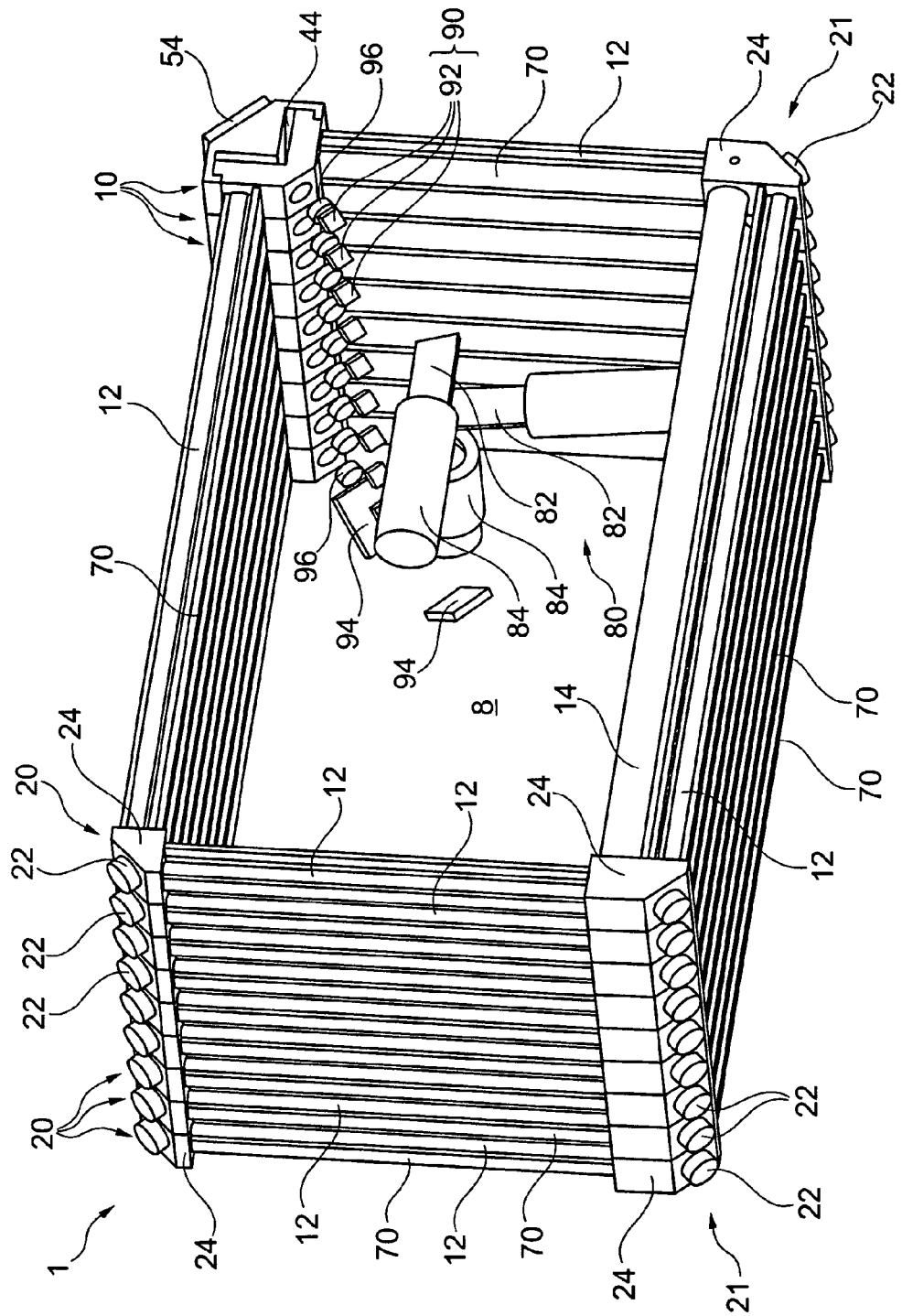
FIG. 4: shows an embodiment of the laser device according to the invention including mapping mirrors and a scanning device.

Another embodiment of a laser device 1 according to the invention is shown in FIG. 4. The laser device according to this embodiment basically corresponds to the laser device shown in FIG. 2. In addition, the laser device 1 comprises a pixel mapper 90 comprising a plurality of mapping mirrors 92. The mapping mirrors 92 are used for mapping the linear arrangement of laser beams into another arrangement and/or for reducing the spacing between the beams of the individual laser units 10. In an embodiment there is at least one mapping mirror 92 per a laser unit 10. The beams of the array of individual outputs are input into the pixel mapper 90, which is arranged in the interior of the cube.

Moreover, a scanning device 80 is arranged in the free central space 8 of the laser device 1. The scanning device 80 includes two movable mirrors 82, each mounted on a galvanometer 84. The laser beams of the laser units 10 are directed onto the movable mirrors 82. The galvanometer scanners are used to move the beam within the field of view of an output optic as required by the application. In addition, a plurality of lenses 96 may be arranged, in particular between the outputs 48 of the laser beams and the mapping mirrors 92. Moreover, one or more additional deflecting mirrors 94 may be provided for reflecting the array of laser beams.

Figure 5:
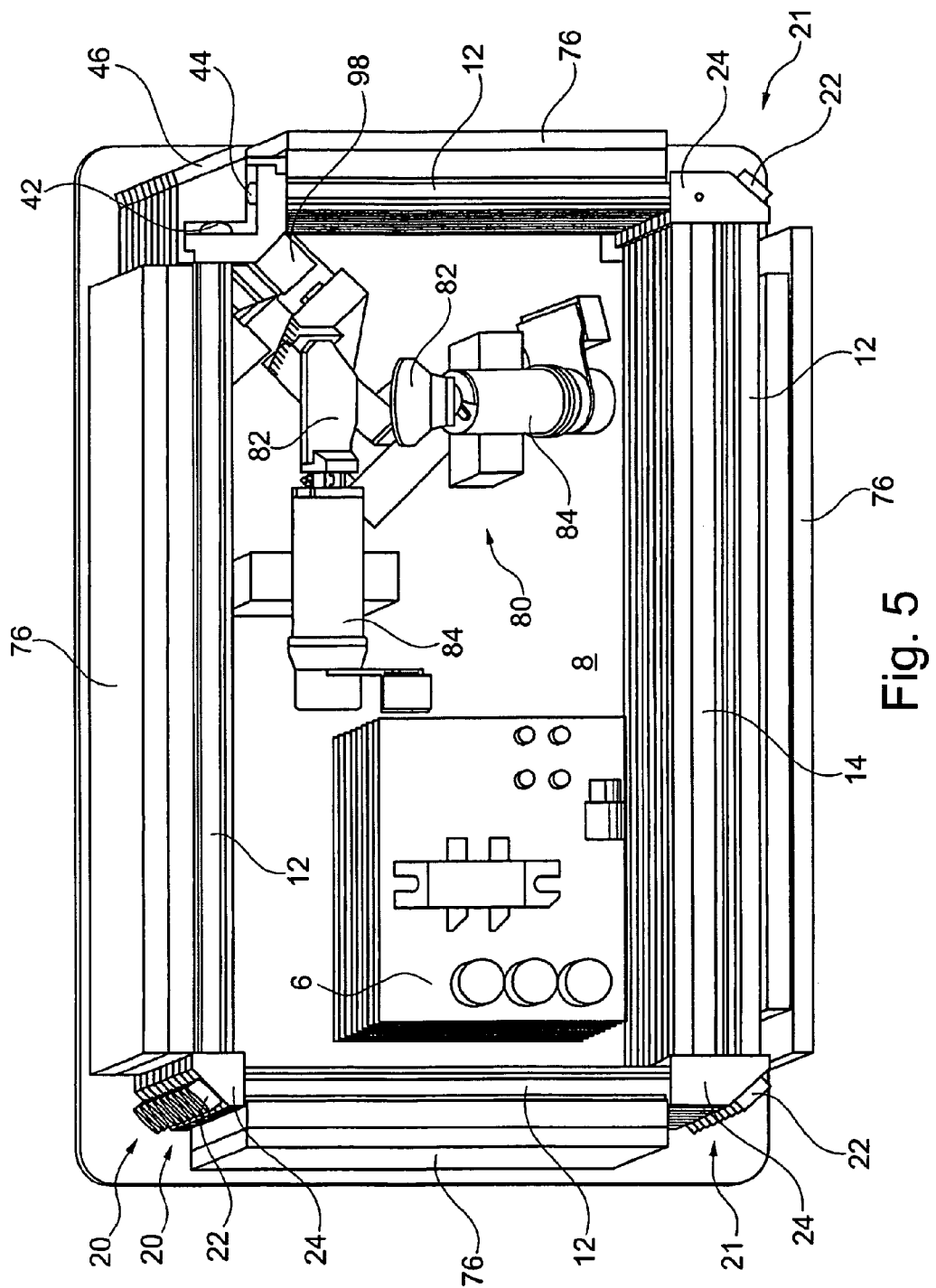
FIG. 5: shows an embodiment of the laser device according to the invention including telescopes and a scanning device.

FIG. 5 shows the internal structure of another embodiment of an inventive laser device 1. As before, the laser device 1 or print head has a cubic profile with the output of laser beams in one corner between two faces of the cube. The laser array is composed of a stack of rectangular two-dimensional laser building blocks or units 10. A radio frequency driver 6 for driving the excitation means 70 of the resonator tubes 12 is arranged in the central space 8. A plurality of telescopes 98 is arranged in the path of the laser beams between the output holes 48 and the scanning device 80. Cooling blocks 76 are attached to those outer sides of the cubic laser device 1 where the resonator tubes 12 are arranged. The cooling blocks 76 have a plurality of channels through which a cooling fluid may circulate.

Figure 6:
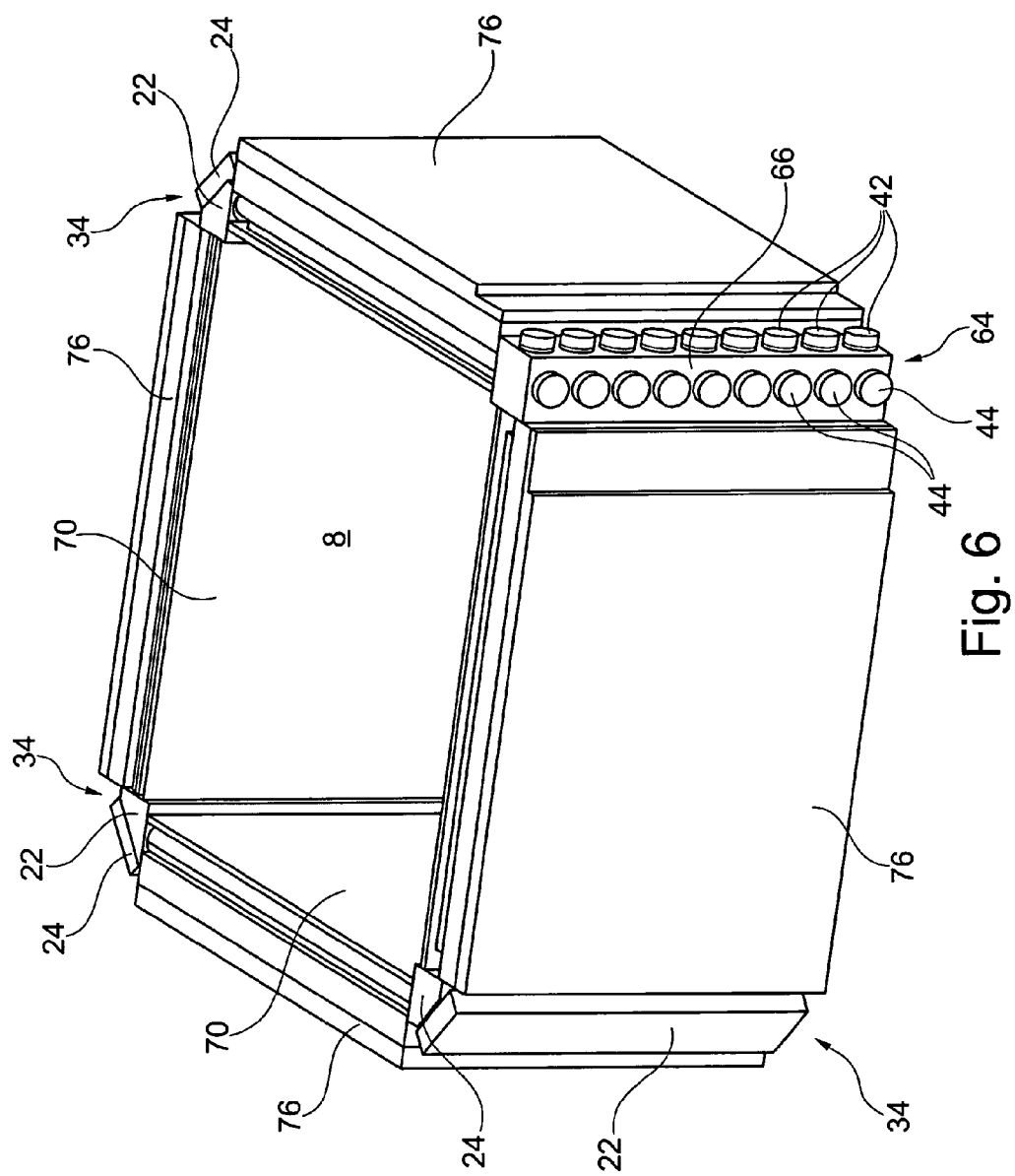
FIG. 6: shows an embodiment of a laser device according to the invention including cooling plates attached to the laser device for cooling the resonator tubes.

FIG. 6 shows the laser device 1 of FIG. 3 together with the excitation means 70 and cooling blocks 76 attached to the resonator tubes 12. There is one cooling block 76 per side of the cubic laser device 1 which cools a plurality of resonator tubes 12 of different laser units 10. The excitation means 70, in particular the electrodes 71, may be integrated into the cooling blocks 76.

Figure 7:
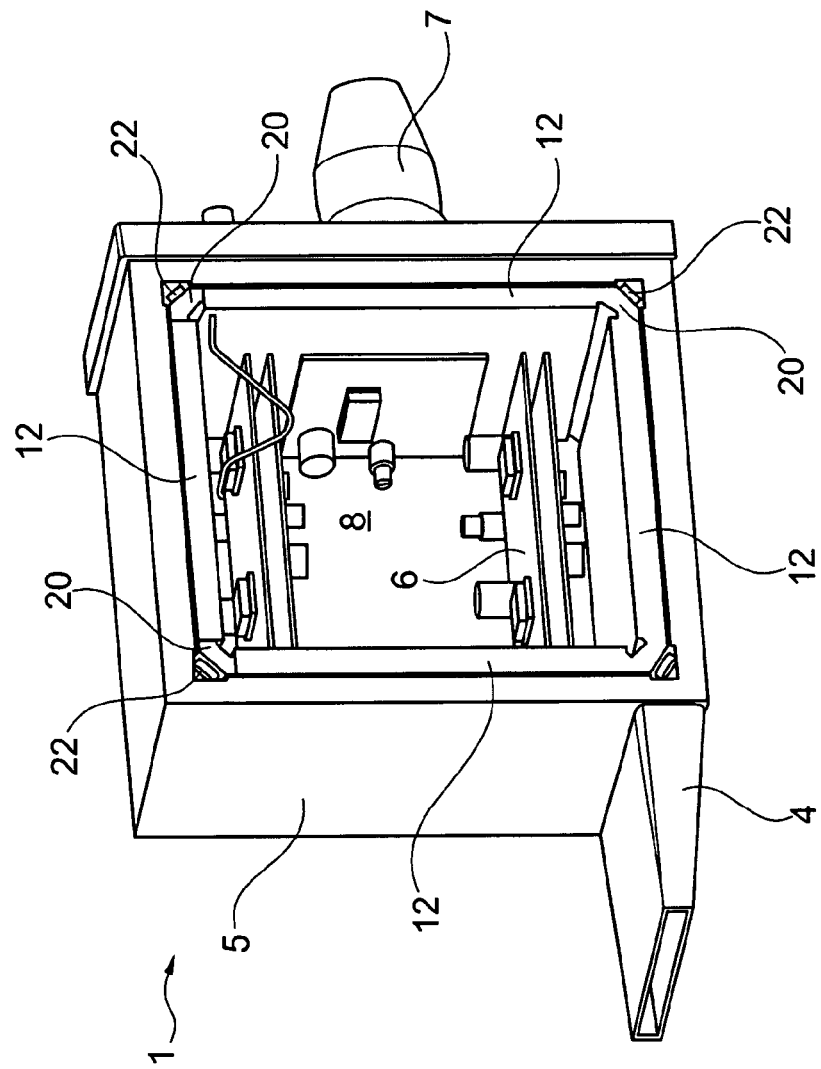
FIG. 7: shows an embodiment of a laser device according to the invention including an air shield.
Figure 8:
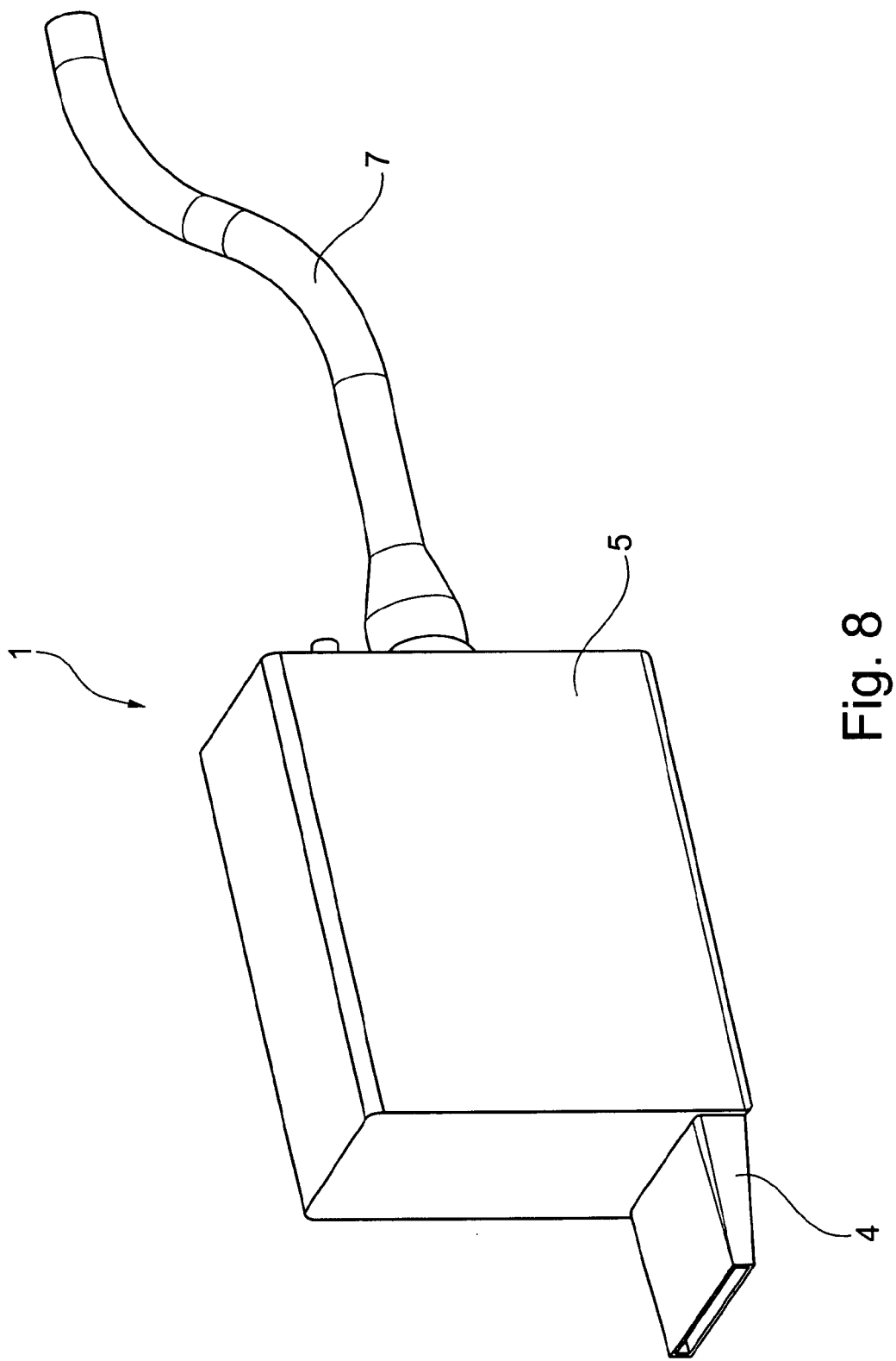
FIG. 8: shows the laser device of FIG. 7 including a housing.

FIGS. 7 and 8 show another embodiment of an inventive laser device 1. A stack of two-dimensional laser units 10 in a square geometry are shown with a protective cover over the multi-beam output 2. This protective cover could consist of an air-knife or air shield 4 which uses positive air pressure to prevent particulates and moisture from getting to the output optics of the lasers. The rear of the module shows the umbilical input for attaching an umbilical 7. FIG. 8 shows the complete module with covers or housing 5 and umbilical 7. In FIG. 7 the covers 5 have been removed from the sides to show the arrangement of the drivers 6 for the excitation means 70 in the central portion of the cube shaped print head module.

Figure 9:
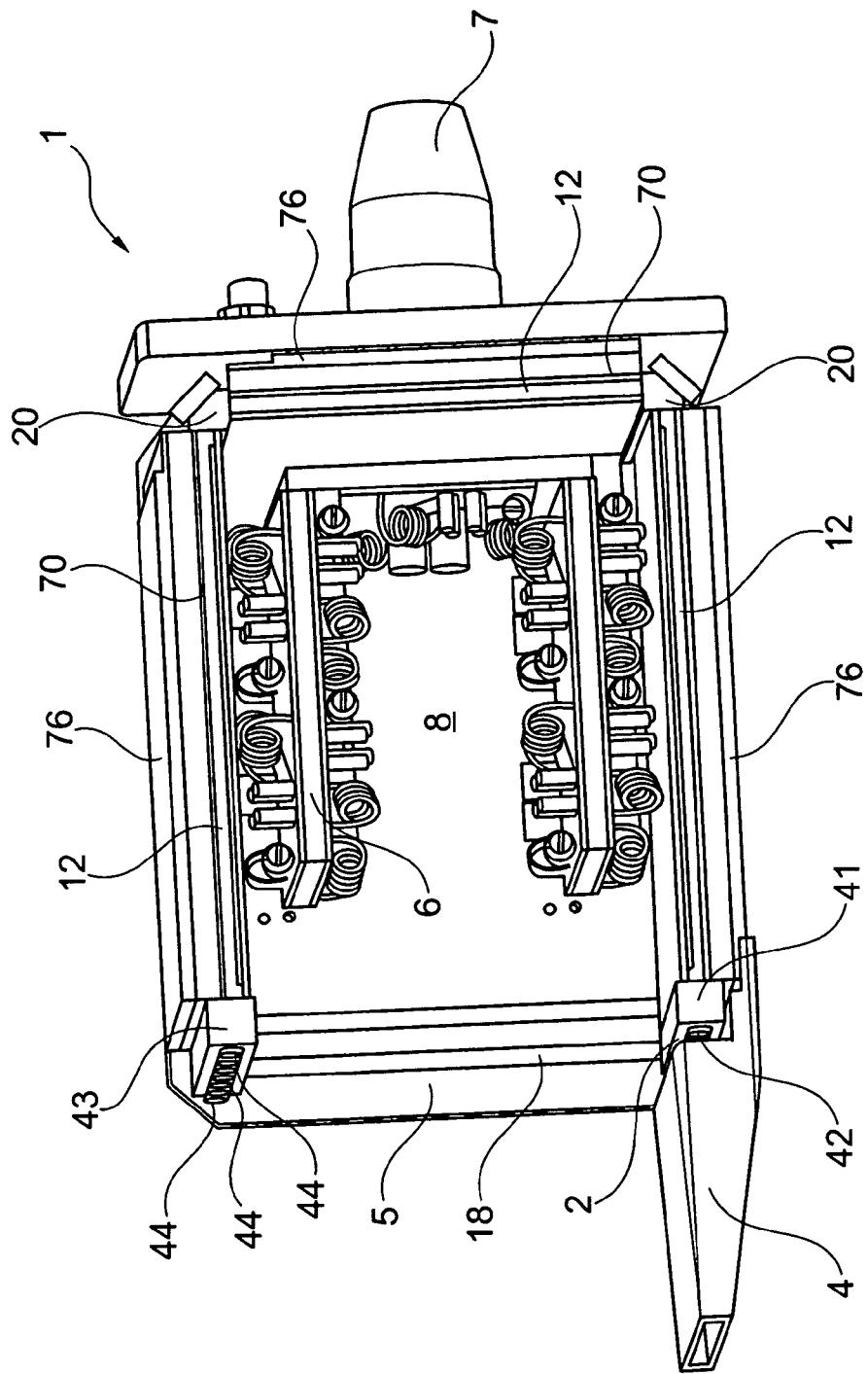
FIG. 9: shows an embodiment of a laser device according to the invention with U-shaped laser units and air shield.

FIG. 9 shows another embodiment whereby the array is composed of a stack of U-shaped modules or units 10 in place of a square module. The U-shaped module can have a lower height and therefore fit into applications where height is an integration constraint. Supporting means 18 are arranged between the end flanges, that is an output flange 41 comprising the output coupler 42 and the rear flange 43 comprising the rear mirror 44, to provide for better stability of the laser head.

Figure 10:
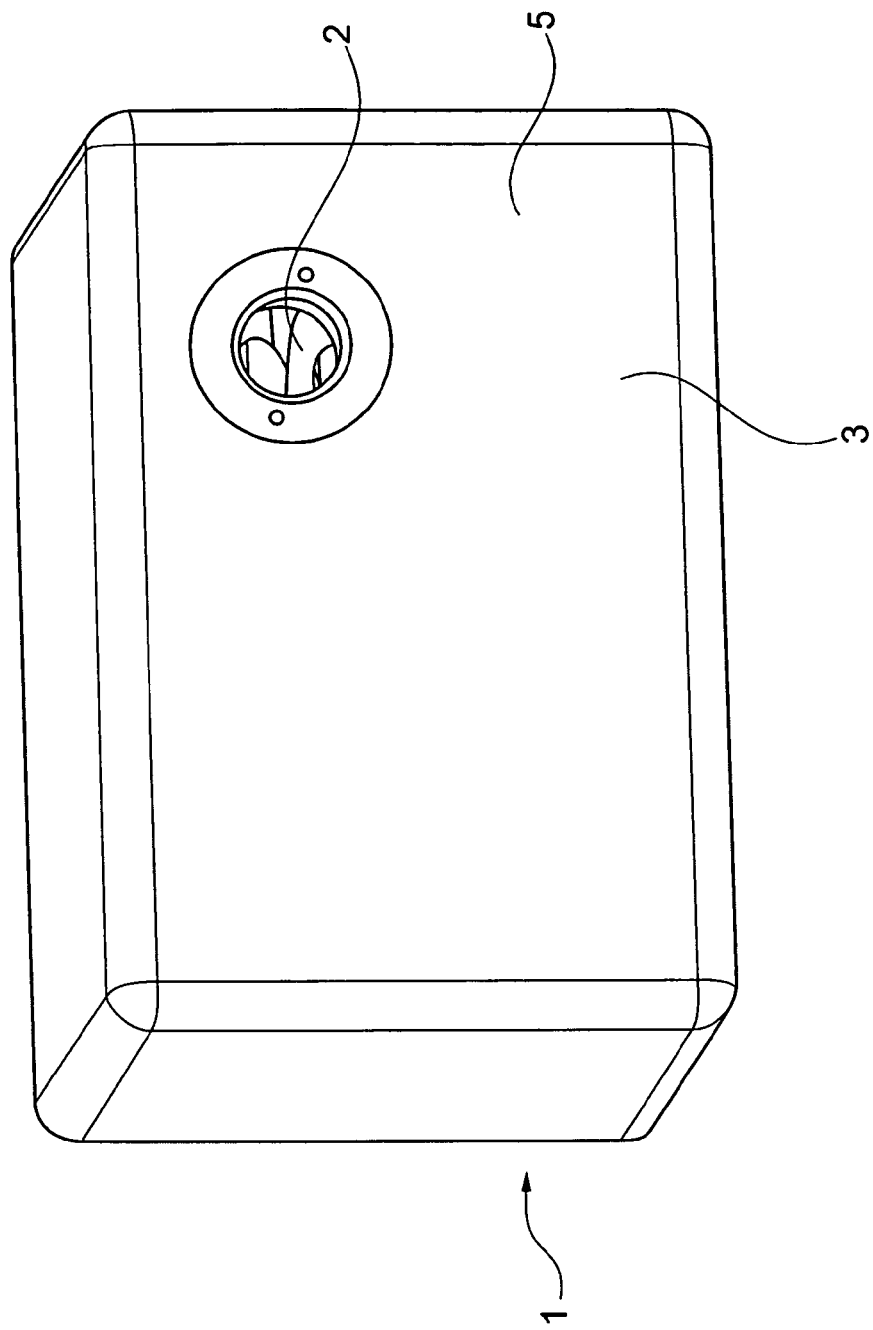
FIG. 10 shows the laser device of FIG. 4 or 5 including a housing.

FIG. 10 shows an outer appearance of a marking head with a scanning device in its inside. The laser beams of the laser units are directed into the inner space of the laser device 1 and redirected by the scanning device through an opening in a head face 3. The opening forms the multi-beam output 2 of the laser device 1.

Figure 11:
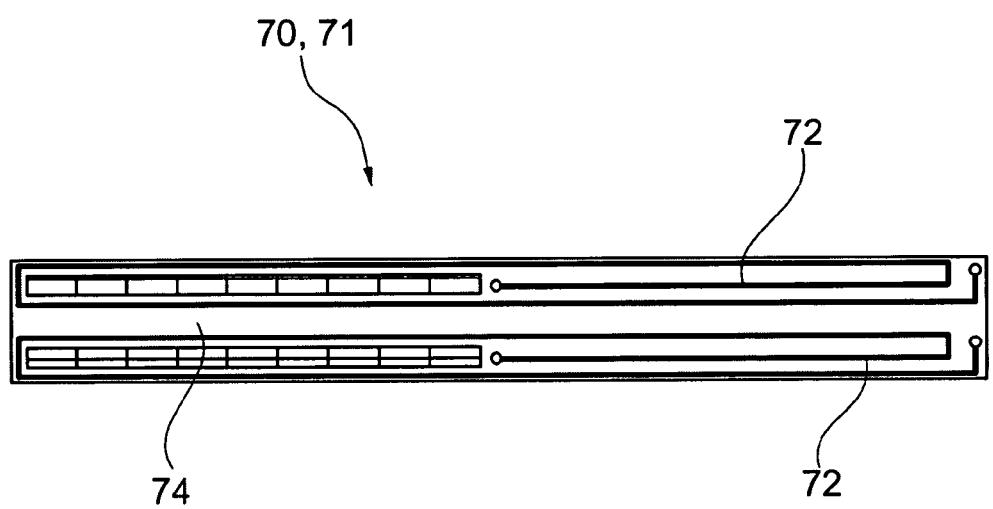
FIG. 11 shows an embodiment of an electrode according to the invention.

FIG. 11 shows an excitation means 70 according to the invention. The excitation means 70 or electrode 71 comprises one or more coils 72 arranged in one single plane in a spiral manner. The coil 72 is arranged on a mounting plate 74.

The invention claimed is:

1. A laser device comprising at least two laser units, which are stacked in layers, each unit being configured to emit a respective laser beam, and each laser unit comprising:

a plurality of resonator tubes for a gas to be excited, the resonator tubes being arranged in a loop and being mechanically connected to each other and forming a common tubular space;
connecting elements for connecting adjacent resonator tubes;
excitation means for the resonator tubes for exciting the gas in the resonator tubes for generating a laser light;
mirrors arranged in the connecting elements for reflecting the laser light between the resonator tubes;
a partially reflecting output coupler for coupling out the respective laser beam, the partially reflecting output coupler terminating a resonator length for the laser light;
a rear mirror; and
an integrated output flange connected between two resonator tubes, the integrated output flange comprising the output coupler and the rear mirror, wherein the rear mirror is provided at a first face of the integrated output flange and the output coupler is provided at a second face of the integrated output flange, wherein:
the integrated output flange of each laser unit comprises an output mirror provided at a third face for deflecting the laser beam passing through the output coupler into a central space surrounded by the resonator tubes, each output mirror being arranged behind the respective partially reflecting output coupler outside the resonator length,
a scanning device is arranged in the central space surrounded by the resonator tubes, the scanning device including at least one movable mirror for deflecting the laser beams coupled out through the output couplers of the laser units into predetermined directions, the movable mirror of the scanning device being arranged outside the resonator length and such that each output mirror, which is arranged behind the respective partially reflecting output coupler outside the resonator length, deflects the respective laser beam to the movable mirror,
the movable mirror being rotatable for producing a scanning movement of a deflected laser beam,
the resonator tubes of each laser unit are arranged in the shape of a closed ring surrounding the central space between them, and
each laser unit is configured to emit the respective laser beam into the central space surrounded by the resonator tubes.

2. The laser device according to claim 1, wherein the layer, in which the resonator tubes of at least one of the laser units are arranged, is a flat plate.

3. The laser device according to claim 1, wherein the partially reflecting output couplers of the laser units are configured to emit parallel laser beams.

4. The laser device according to claim 1, wherein the resonator tubes in the laser units have a same length.

5. The laser device according to claim 1, wherein the connecting elements of the laser units each comprise an inner cavity which is in fluidic communication with the at least two adjacent resonator tubes connected to the connecting element.

6. The laser device according to claim 1, wherein a plurality of connecting elements of the laser units are integrated into a common support structure formed in a corner area of the laser device.

7. A method for marking an object with a laser device comprising at least two laser units, which are stacked in layers, each laser unit being configured to emit a respective laser beam, and each laser unit comprising:
- a plurality of resonator tubes for a gas to be excited, the resonator tubes being arranged in a loop and being in fluidic communication with each other and forming a common tubular space;
- connecting elements for connecting adjacent resonator tubes;
- excitation means for the resonator tubes for exciting the gas in the resonator tubes for generating a laser light;
- mirrors arranged in the connecting elements for reflecting the laser light between the resonator tubes;
- a partially reflecting output coupler for coupling out the respective laser beam, the partially reflecting output coupler terminating a resonator length for the laser light;
- a rear mirror; and
- an integrated output flange connected between two resonator tubes, the integrated output flange comprising the output coupler and the rear mirror, wherein the rear mirror is provided at a first face of the integrated output flange and the output coupler is provided at a second face of the integrated output flange, wherein:
- the laser beams of the laser units are directed by an output mirror provided at a third face of the integrated output flange to a central space surrounded by the resonator tubes, each output mirror being arranged behind the respective partially reflecting output coupler outside the resonator length;
- the laser beams are deflected by a movable mirror of a scanning device arranged in the central space into predetermined directions, the movable mirror being rotatable for producing a scanning movement of the respective laser beams;
- the object is marked with the laser beams deflected by the scanning device,
- the resonator tubes of each laser unit are arranged in the shape of a closed ring surrounding the central space between them, and
- each laser unit is configured to emit the respective laser beam into the central space surrounded by the resonator tubes.

* * * * *